United States Patent [19]

Suzuki et al.

[11] Patent Number: 4,547,676
[45] Date of Patent: Oct. 15, 1985

[54] PHOTOSENSOR APPARATUS WITH LIGHT INTEGRATION CONTROL

[75] Inventors: Takeomi Suzuki; Kenzo Ishibashi; Isamu Hashimoto, all of Tokyo, Japan

[73] Assignee: Asahi Kogaku Kogyo Kabushiki Kaisha, Tokyo, Japan

[21] Appl. No.: 460,627

[22] Filed: Jan. 24, 1983

[30] Foreign Application Priority Data

Jan. 25, 1982 [JP] Japan .................................. 57-8801

[51] Int. Cl.⁴ ............................................. H01J 40/14
[52] U.S. Cl. .................................... 250/578; 250/204; 358/213
[58] Field of Search ............... 250/201, 204, 216, 578, 250/208, 209; 358/212, 213; 354/402–408

[56] References Cited

U.S. PATENT DOCUMENTS 4,297,014 10/1981 Nakamura et al. ................. 250/201
4,326,127 4/1982 Aoki et al. ......................... 250/204
4,329,577 5/1982 Asano et al. ....................... 250/204

Primary Examiner—David C. Nelms
Attorney, Agent, or Firm—Fleit, Jacobson, Cohn & Price

[57] ABSTRACT

A photosensor apparatus for detecting focal position or the like, which uses a plurality of light-receiving elements arranged in a matrix array, is disclosed. Simultaneous light integration is started with respect to all the light-receiving elements, while all the outputs of the light-receiving elements are progressively scanned immediately after the start of the simultaneous light integration. When at least one of the outputs reaches a first reference level, all the outputs are held. If at least one of the held outputs is above a second reference level of a different level, check as to whether all the outputs are below the second reference level is repeatedly done for progressively reducing light integration periods until all the outputs of the light-receiving elements are at a fixed level.

1 Claim, 6 Drawing Figures

PHOTOSENSOR APPARATUS WITH LIGHT INTEGRATION CONTROL

BACKGROUND OF THE INVENTION

1. Field of the Invention

This invention relates to photosensor apparatus.

2. Description of the Prior Art

This photosensor is used for such purposes as detecting the focal position by detecting optical image data in a camera, a video camera, etc. with a plurality of light-receiving elements arranged on the image focusing plane of an image focusing optical system.

In the case of the focal position detection or the like, the brightness of an optical image varies over a wide range and also varies with time. Therefore, it is necessary to always vary the light sensitivity to a suitable level and hold optical image data at a certain instant. Since the light sensitivity of the light receiving element is constant, the adjustment of the light sensitivity is done by storing photons produced in the light-receiving elements and controlling the storage time with the storage value as the output signal. To adjust the storage time, the value of stored photons must always be monitored. However, where a large number of light-receiving elements are used, it is difficult to monitor all the stored values. Accordingly, it has been in practice to monitor the average value of the stored value. However, since the average value is monitored, the output of the light-receiving elements on which light of high illumination intensity is incident is liable to exceed the measurement range. In such a case, it is impossible to determine the extent, to which the measurement range is surpassed.

In order to avoid this, it is thought to progressively scan all or suitably selected ones of the light-receiving elements in which light integration is simultaneously done, thereby monitoring the output of the light-receiving elements. However, there is a limitation on the scanning speed. Therefore, a deviation of the instant of detection of the light-receiving element output occurs, so that in case where the illumination intensity of the optical image varies in a short period of time, the output is liable to exceed a constant range before the completion of one scanning period. In such a case, it is difficult to set the proper light integration period.

SUMMARY OF THE INVENTION

The present invention has been intended in the light of the foregoing affairs, and it is an object of the invention to obtain accurate light detection. To attain this object of the present invention, simultaneous light integration is started with respect to all the light-receiving elements, the outputs of the light-receiving elements are progressively scanned immediately after the start of light integration, and all the outputs are held when at least one of the outputs reaches a first reference level $V_A$ of a certain level. If at least one of the held outputs is above a second reference level $V_B$ of a different level, check as to whether all the outputs are below the second reference level $V_B$ is repeatedly done for progressively reducing light integration period until all the outputs of the light-receiving elements are at a fixed level.

DETAILED DESCRIPTION OF PREFERRED EMBODIMENT

The present invention will now be described with reference to the drawings.

Figure 1:
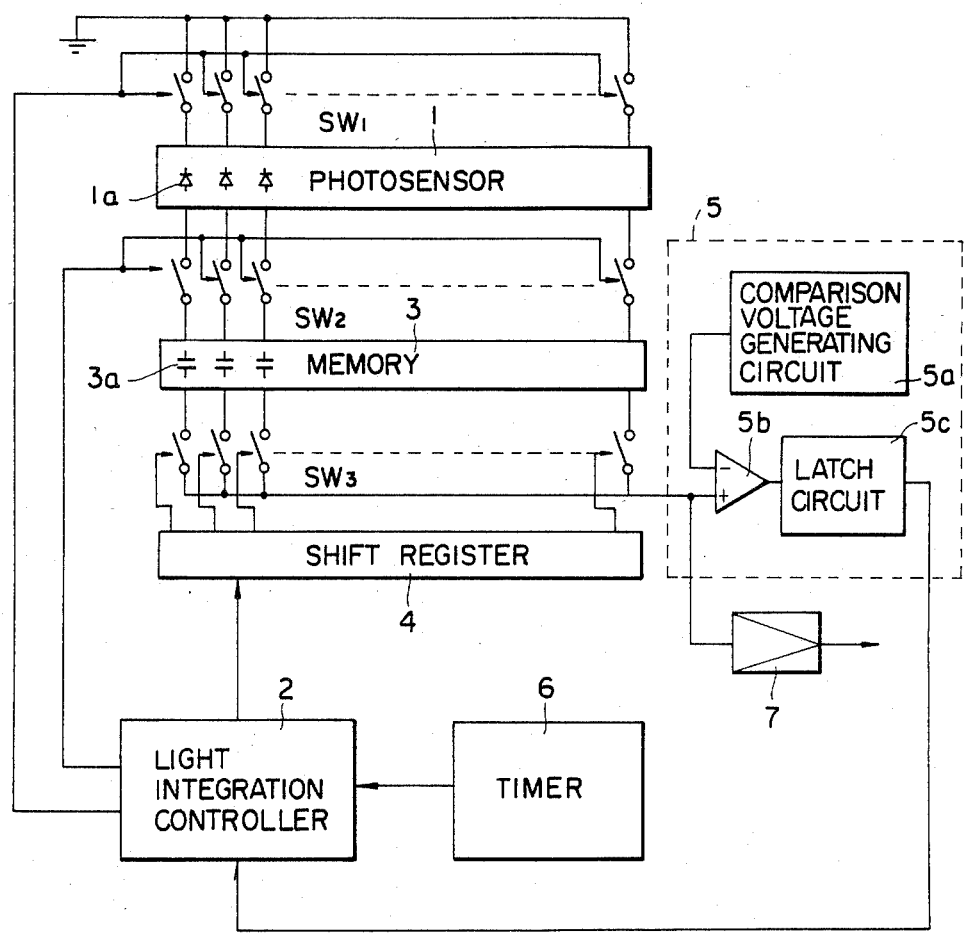
FIG. 1 is a block diagram showing an embodiment of the photosensor apparatus according to the present invention.

FIG. 1 shows an embodiment of the photosensor apparatus according to the present invention. Designated at 1 is a photosensor block, which includes a receiving-element array consisting of a plurality of light-receiving elements 1a of light integration type. Switches SW1, for instance of MOS type, are connected to the respective light-receiving elements 1a. A memory 3 as memory means includes memory elements 3a which are connected to the respective light-receiving elements 1a of the photosensor through MOS type switches SW$_2$. A shift register 4 which serves as scanning means is connected to the memory elements 3a of the memory 3 through respective switches SW$_3$ of MOS type. Through switch SW$_3$, memory 3 is connected to a comparator 5 which serves as comparing means. The comparator 5 includes a comparison voltage generating circuit 5a for setting a reference level, a voltage comparator 5b for comparing the output of memory 3 through switch SW$_3$ with the output of the comparison voltage generating circuit 5a, and a latch circuit 5c for latching the output of the voltage comparator 5b. And through switch SW$_3$, memory 3 is connected to an amplifier 7, which is in turn connected to an analog-to-digital (A/D) converter.

A light integration controller is connected to the switches SW$_1$, which cause charging when they are turned on and cause light integration when they are turned off, and also to the switches SW$_2$, which cause sampling when they are turned on and cause holding when they are turned off. A timer 6, which is counting means for counting light integration period, is connected to the light integration controller 2. The latch circuit 5c of the comparator 5 is also connected to the light integration controller 2.

The operation will now be described with reference to FIGS. 1 to 5.

The light-receiving elements 1a of the photosensor 1 are simultaneously charged to an initial stage when an "on" signal is supplied from the light integration controller 2 to the switches SW$_1$. More particularly, as shown in FIGS. 2 to 5, a voltage $V_C$ is initialized from the instant $t_c$ of the start of charging till the instant $t_s$ of the start of light integration. When an integration start signal is subsequently given from the light integration controller 2, the switches SW$_1$ are turned off causing the light-receiving elements 1a to start light integration, whereby charge is stored according to the intensity of received light as shown by output curves $C_A$ and $C_B$. At this time, the switches $SW_2$ are turned on by a sample signal from the light integration controller 2, whereby the output signal from the light-receiving elements 1a is stored in the memory elements 3a (which may be capacitors) in the memory 3. The data is further fed bit after bit to the comparator 5 through the switching of the switches $SW_3$ and the level is always monitored. The outputs signals of the light-receiving elements 1a are compared with a first reference level $V_A$ which is set by the comparison voltage generating circuit 5a. When one of the compared output signals (i.e., the output of a light-receiving element on which light of the maximum illumination intensity is incident) reaches the first reference level $V_A$, this output is latched in the latch circuit 5c. The light integration controller 2 also provides a hold signal to turn off the switches $SW_2$, whereby all the outputs of the photosensor 1 at this time are held in the memory 3. The data held in the memory 3 may be lagging against the corresponding data at the time of the judgement by the comparator 5, or it may be considerably above the level of the first reference level $V_A$ and, in some case, saturated depending upon the intensity of light incident on the photosensor 1. In this case, the comparator 5 and shift register 4 are reset, and the outputs of the memory 3 are compared with a second reference level $V_B$ in the comparator 5. If the data stored in the memory 3 is effective (i.e., lower than the second reference level $V_B$), it is led through an amplifier 7 to the A/D converter for conversion from analog signal to digital signal. If the data is ineffective (i.e., greater than the second reference level $V_B$), a light integration period, which is shorter than the integration period from the start of the first integration till the start of holding, as measured by the timer 6, is set, and light integration is effected afresh for this period. The result is compared again with the second reference level $V_B$. The sequence of operation described above is repeated until effective data is obtained.

The outputs of the light-receiving element 1a, on which light of maximum illumination intensity is incident, will now be described in connection with cases where the optical image is bright and dark with reference to FIGS. 2 to 5.

Figure 2:
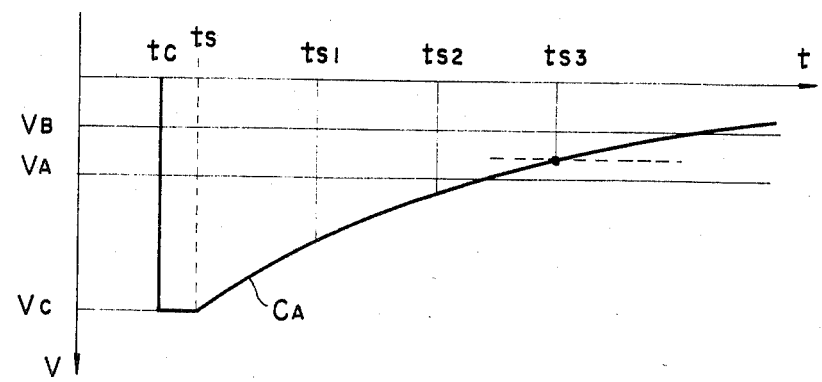
FIG. 2 is a view showing the output of the light-receiving element, on which light of maximum illumination intensity is incident, in case where the measurement object (i.e., optical image) is dark.

FIG. 2 shows a case where the optical image is comparatively dark. Here, curve $C_A$ represents the output of the light-receiving element 1a, on which light of maximum illumination intensity is incident. In this case, the output signal of the light-receiving element 1a does not reach the first reference level $V_A$ suitable for the light detection until the instant $ts_1$ when the first scanning is completed. It also does not reach the level $V_A$ till the completion of the second scanning, and reaches the level $V_A$ only until the instant $ts_3$ when the third scanning is completed. At this time, the outputs of the light-receiving element 1a and the other light-receiving elements 1a are held by a hold signal. In this case, there is no light-receiving element, the output of which exceeds the second reference level $V_B$, because the output signal change is gentle.

Figure 3:
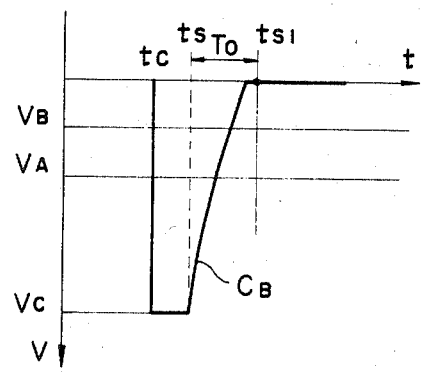
FIGS. 3, 4 and 5 are view showing the output of the light-receiving element, on which light of maximum illumination intensity is incident, in case where the measurement object is bright.
Figure 4:
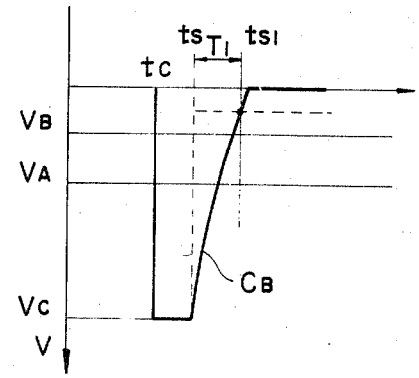
Figure 5:
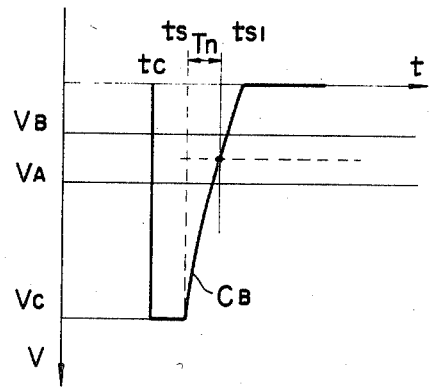

FIGS. 3 to 5 show cases where the optical image is bright. Here, curve $C_B$ represents the output of the light-receiving element 1a, on which light of maximum illumination intensity is incident. In the case of FIG. 3, the output signal of the light-receiving element 1a is discharged beyond the reference levels $V_A$ and $V_B$ to reach and be held at the saturation level until the instant $ts_1$ when the first scanning is completed as shown in FIG. 3. This is because of the fact that the output changes so quickly that it has already exceeded the second reference level $V_B$ when it reaches the first reference level $V_A$. Thus, it is necessary to reduce the next light integration period. The light integration period $T_0$ has been counted by the timer 6 and known. Therefore, the next light integration time $T_1$, which is obtained by multiplying the period $T_0$ by $\alpha(0<\alpha<1)$ is) is $T_1 = \alpha T_0$. If the output of the light-receiving element 1a is not lower than the second reference level $V_B$ at the end of the light integration period $T_1$ as shown in FIG. 4, the light integration is repeated once and again. For instance, if the light integration period if $T_n = \alpha T_{n-1} = \alpha^n T_0$, the output of the light-receiving element 1a is less than the second reference level $V_B$ as shown in FIG. 5 and is thus held by the hold level. As is shown, so long as the brightness is below a certain reference level, the light integration is repeated a number of times. However, since the integration period necessary when the optical image is bright, the total period necessary for the detection is not so long.

Figure 6:
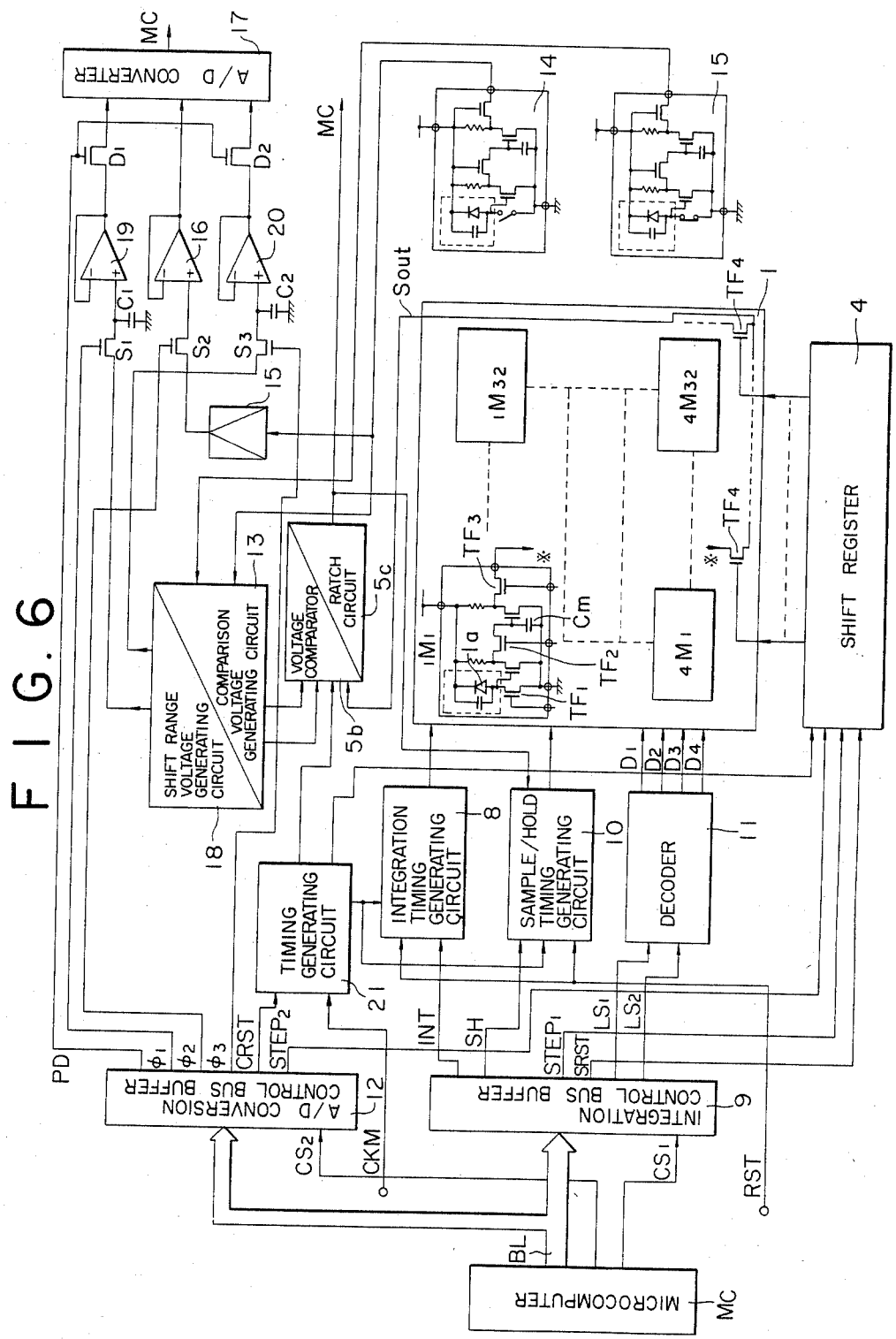
FIG. 6 is a schematic showing a detailed example of the circuit shown in FIG. 1.

FIG. 6 is a block diagram showing a detailed example of the block diagram of FIG. 1. Photosensor 1 includes photosensor cells $1M_1$ to $4M_{32}$ which form a matrix array of four rows by 32 columns. The photosensor cells $1M_1$ to $4M_{32}$ each include a light-receiving element 1a, a MOS type switch element $TF_1$ corresponding to the switch $SW_1$, a MOS type switch element $TF_2$ corresponding to the switch $SW_2$, and a MOS type switch element $TF_3$ for selecting the pertaining matrix row of the photosensor 1. The MOS type switch element $F_1$ is controlled by an integration timing generating circuit 8. The integration timing generating circuit 8 operates when starting the light integration by discharging the light-receiving element 1a. The circuit 8 is controlled by a signal INT of an integration control bus buffer 9, which leads to a bus line from a microcomputer MC constituting control means. The MOS type switch element $TF_2$ is controlled by a sample/hold timing generating circuit 10. The sample/hold timing generating circuit 10 operates when memory 3 holds the light integration signal obtained from the light-receiving element 1a at a predetermined instant. The circuit 10 is controlled by a signal SH from the integration control buffer 9. The MOS type swtich element $TF_3$ is controlled by outputs $D_1$ to $D_4$ from a decoder 11, which decodes signals $LS_1$ and $LS_2$ of an integration control bus buffer 9, for taking out an integration signal from the light-receiving element 1a. The microcomputer MC, integration control bus buffer 9, integration timing generating circuit 9 and sample/hold timing generating circuit 10 constitute the light integration controller 2.

The photosensor cells $1M_1$ to $4M_{32}$ also each include a capacitor $C_m$, which constitutes the memory element 3a of the memory 3 leading to the MOS type switch element $TF_2$. The selection of the matrix columns of the photosensor 1 is done by MOS type switch elements $TF_4$ which are driven by the shift register 4. The shift register 4 is scanned bit after bit by a signal $STEP_1$ of the integration control bus buffer 9 and also by a signal $STEP_2$ from an A/D conversion control bus buffer 12, which, like the integration control bus buffer, the bus line BL of the microcomputer MC is lead. The selection of the signals $STEP_1$ and $STEP_2$ is controlled by chip select signals $CS_1$ and $CS_2$ respectively supplied to the integration control bus buffer 9 and A/D conversion control bus buffer 12. As the scanning is carried out, the light integration signal $S_{out}$ obtained from the individual photosensor cells $1M_1$ to $4M_{32}$ of the photosensor 1 is supplied to the voltage comparator 5b constituting the comparator 5. A comparison voltage generating circuit 13 is connected to the voltage comparator 5b, and the voltage comparator 13 provides the first and second reference levels $V_A$ and $V_B$. The outputs of cells 14 and 15 serve as level sources for obtaining the first and second reference levels $V_A$ and $V_B$. The cell 14 provides its output when the photosensor 1 is saturated, while the cell 15 provides an output before the start of the light integration by the photosensor 1. The first and second reference levels $V_A$ and $V_B$ are thus in predetermined signal level ranges by the respective cells 14 and 15. The voltage comparator 5b effects comparison with the timing of a clock produced from a timing generating circuit 21. System A clock source is externally supplied to the timing generating circuit 21, which supplies clocks for the shift register 4, integration timing generating circuit 8 and sample/hold timing generating circuit 10 which constitutes the comparator 5 and is operated by the output of a latch circuit 5c to be described later.

The voltage comparator 5b compares the output of the photosensor 1 with the first reference level $V_A$. As a result, the output of the voltage comparator 5b is inverted to invert the output of a flip-flop (not shown) which constitutes the latch circuit 5c, whereby the light integration signals of all the photosensor cells $1M_1$ to $4M_{32}$ are held. The hold signal obtained thus is supplied to the microcomputer MC, whereby the microcomputer MC acknowledges the end of the first scanning of the photosensor 1. When this data is supplied, a soft timer which serves as counting means based for counting according to a program of the microcomputer MC, stops the counting of the light integration, whereby data for the integration period for the first light integration can be obtained. After this data has been obtained, the shift register 4 is driven again, and the voltage comparator 5b compares the output of the photosensor 1 with the second reference level $V_B$. When a overranged photosensor cell is detected, scanning is done with a shorter integration period of the previous light integration, and the flow of time counting is repeatedly executed until any overranged photosensor cell is no longer detected or until the shortest integration period of the soft timer is reached. The output of the photosensor 1 that is obtained in accordance with this flow, is coupled through a level shifter/amplifier 15 and a voltage follower for impedance conversion 16, these constituting the amplifier 7, to the A/D converter 17. The shift range of the level shifter/amplifier 15 is determined by the outputs of the voltage followers 19 and 20, which receive the output of a shift range voltage generating circuit 18. The shift range voltage generating circuit 18 provides output, which is determined by the first and second reference levels $V_A$ and $V_B$ obtained from the comparison voltage generating circuit. The data thus obtained from the photosensor 1 is fed through the A/D converter 17 to the microcomputer MC for data processing. After the data processing has been ended, similar processing is carried out afresh for the next light integration.

In FIG. 6, designated at $S_1$ to $S_3$ are switch elements connected to the input terminal of respective voltage followers 19, 16 and 20. The switch elements $S_1$ to $S_3$ are controlled by respective signals $\phi_1$ to $\phi_3$ of the A/D conversion control bus buffer 12. Designated at $C_1$ and $C_2$ are matching capacitors connected to the input terminal of the respective voltage followers 19 and 20. Designated at $D_1$ and $D_2$ are switch elements connected to the output terminal of the respective voltage followers 19 and 20. The switch elements $D_1$ and $D_2$ serve to suppress power supply to the A/D converter 17 in response to a signal PD provided from the A/D conversion control bus buffer 12. The shift register 4 is reset by a signal SRST from the integration control bus buffer 9, and the timing generating circuit 21 is reset by a signal CRST from the A/D conversion control bus buffer 12. The integration timing generating circuit 8 and sample/hold timing generating circuit 10 are reset by a reset signal RST from the microcomputer MC.

As has been described in the foregoing, according to the present invention even where the data of a measurement object has a broad brightness range and has various light intensity distributions, accurate light intensity detection can be obtained in a short period of time without the possibility for the measurement range to be exceeded since the period the light integration is adjusted with respect to the maximum illumination intensity portion. Further, the integrated data is temporarily stored in storing means before it is statically fetched out, so that these is no noise influence of MOS type switches that might otherwise occur at the time of dynamic operation. If this photosensor apparatus is used for the detection of focal position, quicker and more accurate detection compared to the prior art can be obtained.

What is claimed is:

1. A photosensor apparatus comprising:

a light-receiving element array consisting of a plurality of light integration type light-receiving elements;

memory means consisting of plural memory elements each connected to a respective one of said light-receiving elements via a respective one of a plurality of switches for, after the light-receiving elements start the light integration, storing an output signal of the said respective one of the light-receiving elements while the one switch is closed to thereby perform sampling, and said memory means holding the output signal of said light-receiving elements substantially simultaneously when said switches are opened at any instant;

scanning means for scanning the memory elements corresponding to at least some of said light-receiving element array during the sampling or after the holding and for progressively obtaining the outputs of these light-receiving elements;

comparing means for comparing the output signals of the light-receiving elements progressively obtained by said scanning means with a first of two reference levels, and said comparing means comparing said output signals with a second of said two reference levels dependent upon a control signal, said second reference level corresponding to a greater degree of received light than said first reference level;

time counting means for counting the light integration time period during which said light-receiving elements are producing a charge due to the light received thereby and during the storage of the charges from the start of the light integration;

control means for controlling the switches connecting respective memory means and light-receiving elements and for controlling said scanning means, said control means coupled to said comparing means and being effected thereby, said control means including:

- a means for closing said switches and starting said time counting means simultaneously with the start of light integration by said light-receiving elements;
- a first means for timed actuation of said scanning means after the closure of said switches by said first means;
- means for opening said switches thereby causing said memory means to hold all the output signals from the light-receiving elements substantially simultaneously and for stopping the counting of said time counting means when one of said output signals exceeds said first reference level based upon said comparing means;
- a second means for actuating said scanning means and for generating said control signal to effect the comparison each of the output signals to said second reference level in said comparing means;
- means for identifying the output signals as effective detection signals when none of the output signals exceeds said second reference level based upon said comparing means;
- means for restarting the light integration period;
- means for reducing the timed actuation of said scanning means and reducing the light integration time period when any one of said outputs exceeds said second reference level based upon the comparison in said comparing means, said means for reducing obtaining a ratio of the count in said time counting means and effecting the timed actuation of said scanning means in accordance with said ratio;
- means for further restarting the light integration period utilizing the reduced light integration time period and for further reducing the light integration time period until all of the outputs do not exceed said second reference level based upon said comparison means.

* * * * *